United States Patent
Harkness et al.

(10) Patent No.: US 7,698,390 B1
(45) Date of Patent: Apr. 13, 2010

(54) PLUGGABLE DEVICE SPECIFIC COMPONENTS AND INTERFACES SUPPORTED BY CLUSTER DEVICES AND SYSTEMS AND METHODS FOR IMPLEMENTING THE SAME

(75) Inventors: Jennifer C. Harkness, Somerville, MA (US); Ira Pramanick, San Jose, CA (US); Ashwinee B. Khaladkar, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1267 days.

(21) Appl. No.: 11/093,914

(22) Filed: Mar. 29, 2005

(51) Int. Cl.
G06F 15/177 (2006.01)
G06F 15/16 (2006.01)

(52) U.S. Cl. ...................... 709/220; 709/201
(58) Field of Classification Search ................. 709/201, 709/220
See application file for complete search history.

(56) References Cited

U.S. PATENT DOCUMENTS 6,101,323 A * 8/2000 Quarles et al. ................. 703/2
6,108,699 A 8/2000 Moiin
6,178,529 B1 * 1/2001 Short et al. ................... 714/51
6,360,331 B2 * 3/2002 Vert et al. ...................... 714/4
6,658,587 B1 * 12/2003 Pramanick et al. ............. 714/5

* cited by examiner

Primary Examiner—Ario Etienne
Assistant Examiner—Avi Gold
(74) Attorney, Agent, or Firm—Marsh Fischmann & Breyfogle LLP; Kent A. Lembke (57) ABSTRACT

A distributed computing system is provided. The system includes a first node, a second node in communication with the first node, and a device coupled to the first node and second nodes. The first node and the second node include component specific modules. The first and second nodes access the device via a selected component specific module defined in the first and second nodes, respectively. The selected component specific module corresponds with the device. An apparatus for using a device having quorum device functionality as a quorum device in a clustering environment, a method and computer program embodied on a computer readable medium for using a device as a quorum device in a cluster environment, and a method and a computer program embodiment on a computer readable medium for interfacing with a quorum device coupled to a node in a cluster environment, are also provided.

11 Claims, 6 Drawing Sheets

PLUGGABLE DEVICE SPECIFIC COMPONENTS AND INTERFACES SUPPORTED BY CLUSTER DEVICES AND SYSTEMS AND METHODS FOR IMPLEMENTING THE SAME

BACKGROUND

Highly available distributed computer systems can provide businesses with round-the-clock uninterrupted access to reliable data. One way to achieve high availability is by implementing computer clustering. A computer system cluster (herein also referred to as cluster) includes a group of two or more nodes wherein each node has the capability to communicate and exchange data with every other node in the cluster. One or more storage devices coupled to one or more cluster nodes can also be included. Maintaining the integrity of data and resources in a cluster, and minimizing the negative effects of split-brain and amnesia can be achieved by using a quorum algorithm and establishing a quorum. In certain scenarios, however, an external vote provided by a quorum device is needed to establish a quorum (e.g., a two-node cluster wherein the majority of votes cannot be gained by a single node).

Currently, very few device types can be used as quorum devices. Furthermore, the current cluster computer program code is a rather long monolithic, and significantly intermeshed code. The cluster code includes quorum algorithm code as well as pieces of computer code written specifically to deal with the few available quorum device types. As a result, adding a new type of quorum device to a cluster can require significant modifications to the cluster code. Of course, such substantial modifications can be a rather time consuming and magnanimous task. Yet further, the cluster code has to be modified repeatedly as new device types are to be used as quorum devices. Still further, the monolithic and intermeshed nature of the code requires that pieces of code associated with every type of quorum device to be loaded into the operating system kernel. In most scenarios, however, the node may only be coupled to a single type of quorum device.

SUMMARY

It should be appreciated that the present invention can be implemented in numerous ways, such as a process, an apparatus, a system, a device, or a method on a computer readable medium. Several inventive embodiments of the present invention are described below.

According to one embodiment of the present invention, a distributed computing system is provided. The system includes a first node, a second node, and a device that is coupled to the first node and the second node. The first node is in communication with the second node. The first node and the second node each includes component specific modules. The first node and the second node are configured to access the device via a selected component specific module that is defined in the first node and the second node. The selected component specific module is configured to correspond with the device.

According to another embodiment, an apparatus for using a device having quorum device functionality as a quorum device in a clustering environment is provided. The apparatus includes a node coupled to the device. The node includes a plurality of modules each of which includes program instructions for the node to interface with different devices. If the plurality of modules includes a quorum device specific module associated with the device, the quorum device specific module is configured to enable the node to interface with the device.

In accordance to yet another embodiment of the present invention, a method for using a device as a quorum device in a cluster environment that includes a plurality of nodes is provided. The method includes determining if the device includes quorum device functionality and determining if a module associated with the device has been loaded. If the module associated with the device has not been loaded, the method further includes loading the associated module. Also included in the method is communicating with the device using the associated module.

According to still another embodiment of the present invention, a method for interfacing with a quorum device coupled to a node in a cluster environment is provided. The method includes determining a type of the quorum device and loading only a module associated with the type of the quorum device. The method also includes using the associated module to access the quorum device.

In accordance with yet another embodiment of the present invention, a computer program embodied on a computer readable medium for using a device as a quorum device in a cluster environment including a plurality of nodes is provided. The computer program includes program instructions for determining if the device includes quorum device functionality and program instructions for determining if a module associated with the device has been loaded. If the module associated with the device has not been loaded, the computer program includes program instructions for loading the associated module. Also included in the computer program are program instructions for communicating with the device using the associated module.

According to still another embodiment of the present invention, another computer program embodied on a computer readable medium for interfacing with a quorum device coupled to a node in a cluster environment is provided. The computer program includes program instructions for determining a type of the quorum device and program instructions for loading only a module associated with the type of the quorum device. Also included in the computer program are program instructions for using the associated module to access the quorum device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

One of ordinary skill in the art must recognize and appreciate that although specific reference may have been made to terminology defined by Sun Microsystems, Inc., it should be understood that any name could be used for such terms, so long as the desired functionality is achieved. For instance, the underlying environment for the device can be any appropriate environment.

Figure 1A:
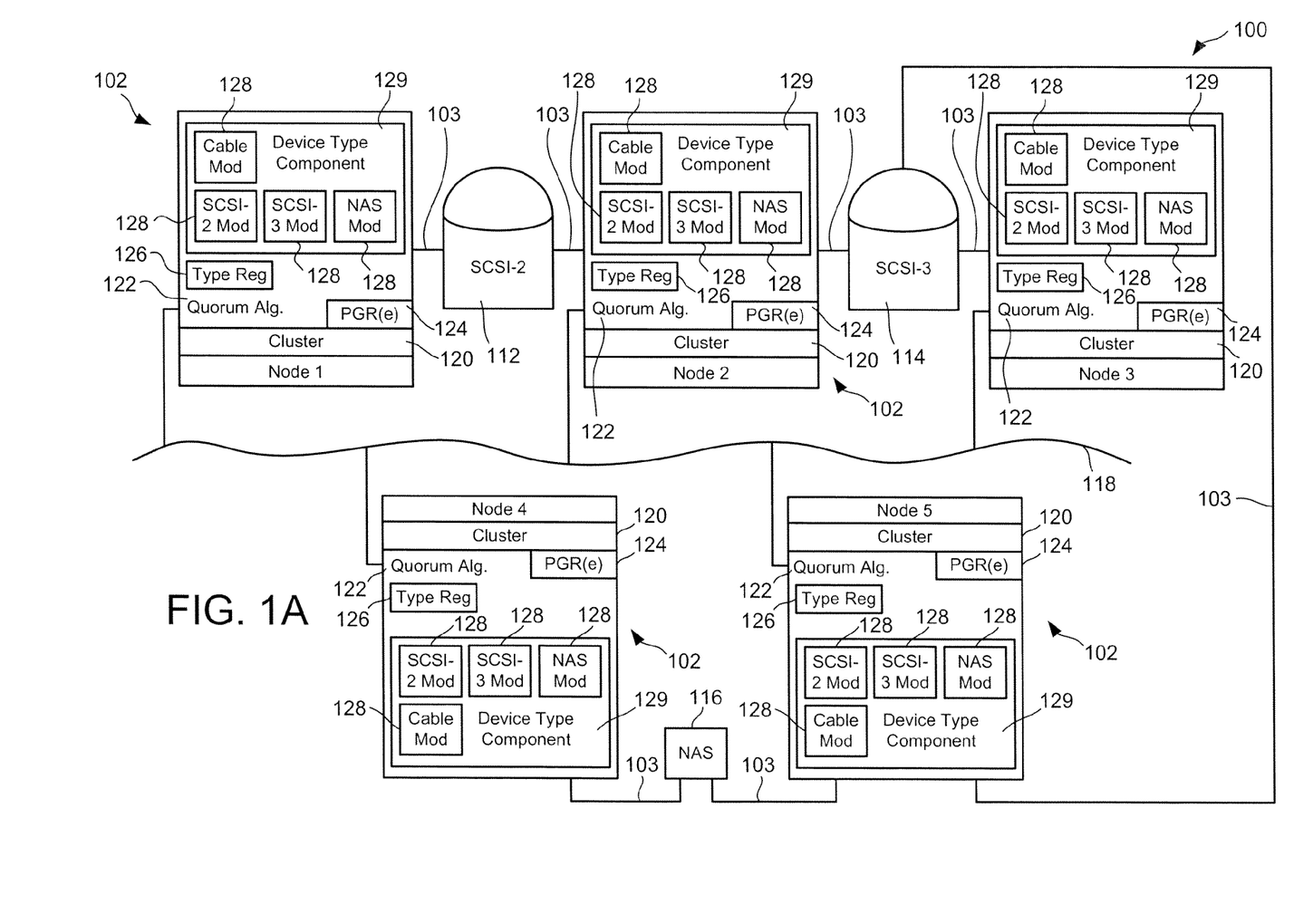
FIG. 1A is an illustration depicting a distributed computer system, in accordance with one embodiment of the present invention.

FIG. 1A is a simplified schematic diagram of an exemplary distributed computer system 100, in accordance with one embodiment of the present invention. Each node 1-5 of the distributed computer system is interconnected to the other nodes of the distributed computer system 100 via an interconnect 118, which in one example, can be a hub. In the illustrated embodiment, nodes 1-5 are down. As such, a cluster has not been formed, yet. However, as described in more detail below, nodes 1-5 are configured such that a cluster can be formed once a quorum exists.

The distributed computer system 100 includes devices 112, 114, and 116, which in one example, can be a peripheral device. In the illustrated embodiment, the device 112 is a Small Computer System Interface compatible (SCSI)-2 attached disk coupled to nodes 1 and 2 via path 103. The device 114 is a SCSI-3 compatible attached disk coupled to nodes 2, 3, and 5 via paths 103 while the device 116 is a network-attached storage (NAS) storage coupled to nodes 4 and 5. The device 112 can be shared by nodes 1 and 2, the device 114 can be shared by nodes 2, 3, and 5, and the device 116 can be shared by nodes 4 and 5. According to one embodiment of the present invention and as provided with more details with respect to FIG. 1B, nodes 1-5 can use devices 112, 114, and 116 as quorum devices if devices 112, 114, and 116 can support a set of quorum device functions defined by a set of quorum algorithm API functionalities included in each of the nodes 1-5.

Each of the nodes 1-5 includes a cluster code 120 and a quorum subsystem 102. The quorum subsystem 102 includes a quorum algorithm 122, a type registry 126, a persistent group reservation/persistent group reservation emulation (PGRe) 124, and a device type component 129. The quorum algorithm 122, the quorum device type registry 126, the quorum device type component 129, and the PGR(e) 124 as well as respective functionalities are described in more detail with respect to FIGS. 2-3B.

Each device type component 129 is configured to include a plurality of device type modules 128, with each device type module 128 corresponding to a type of device. In the embodiment illustrated in FIG. 1A, the device type component 129 includes a SCSI-2 module, a SCSI-3 module, a NAS module, and a cable module 128. However, none of the device specific components (e.g., SCSI-2 module, SCSI-3 module, NAS module, and cable module 128) included in the device type component 129 has been loaded, as a cluster has not been formed, yet. Additional information with respect to the capabilities of the pluggable interface of the present invention to load only device specific components (i.e., modules 128) corresponding to devices 112, 114, and 116 is provided below with respect to FIG. 2.

Figure 1B:
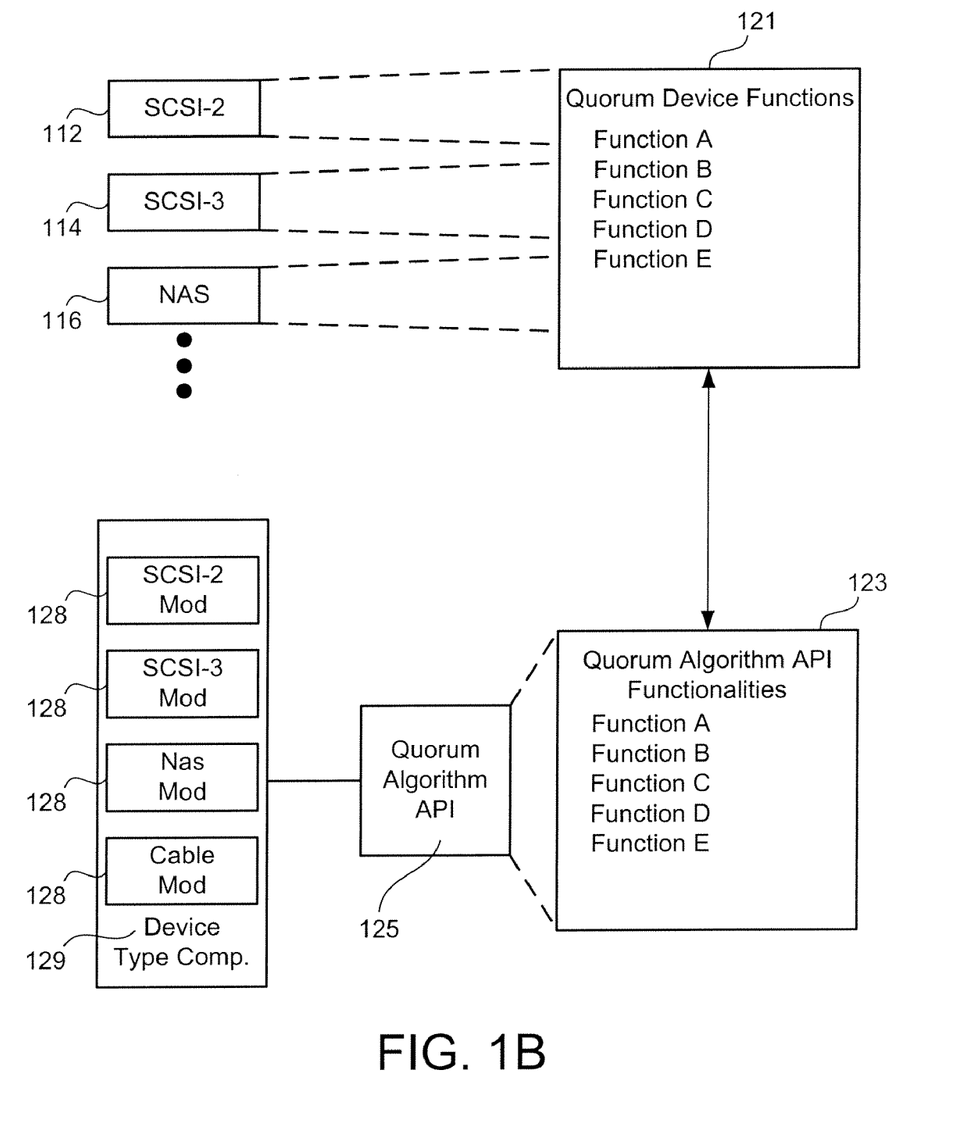
FIG. 1B is a simplified diagram showing a correlation between a set of quorum device functions supported by each of the SCSI-2, SCSI-3, and NAS devices and a set of quorum algorithm API functionalities provided by the quorum algorithm API of the present invention, in accordance with still another of the present invention.

Reference is made to the simplified diagram depicted in FIG. 1B showing each of the SCSI-2 112, SCSI-3 114, and NAS 116 devices having quorum device functionality supporting a set of quorum algorithm API functionalities 123 of the quorum algorithm API 125, in accordance with one embodiment of the present invention. As referred to herein, quorum device functionality is a set of functions that should be supported by each device if the device were to be used as a quorum device. Specifically, in the illustrated embodiment, the quorum device functionality includes a set of functions A-E, as provided in 121. In one example, quorum device functionality includes determining a membership, persistence of membership determination, etc. (e.g., PGR-style functions provided in Table 1 below, etc.).

In turn, device type modules 128, as included in the device type component 129 of each of the nodes 1-5 implement a set of quorum algorithm API functionalities 123, as provided by a Quorum Algorithm API 125, so as to communicate with corresponding devices. As referred to herein, quorum algorithm API 125 is an interface, which defines the set of functionalities that any given device must support if the given device were to be used as a quorum device. As can be seen, the set of quorum algorithm API functionalities 123 includes functions A-E, which are supported with functions A-E of the quorum device functions 121. In this manner, any function call supported by each quorum device can be supported with the corresponding API function of the quorum algorithm API functionalities.

In one embodiment, quorum devices 112, 114, and 116 support functions 123 that are PGR-style function calls, as provided in Table 1 below. Each quorum device provides an associated mechanism to implement the quorum device functions. As can be seen, the return value of each quorum device function call can be an indication as to the success or failure (EIO/EACCESS) of the function call. In one instance, information listed under "Output" can be in the form of changes to IDL in/out parameters. According to one example, EACCES and EIO are two types of error conditions that can be expected from a function call to a device. The EACCES error indicates that the calling node does not have access permission to the quorum device. For instance, the quorum algorithm can interpret the EACCES as a condition wherein the calling node has been removed from the cluster membership. In another example, the EACCES error can be configured to panic the calling node. The EIO error is generated when access to the device is failed due to complications not related to permission errors. In such a scenario, an assumption is made that the device is faulty, thus seizing issuance of further quorum commands to the quorum device. Of course, one must appreciate that the device can be assigned an effective quorum vote of zero (0).

One of ordinary skill in the art must recognize and appreciate that the exemplary PGR-style function calls provided in Table 1 are configured to return an output in a short period. In one example, the function calls can be expected to return the output on the order of milli-seconds. Further, one must note that the quorum device module implementing the exemplary interfaces provided in Table 1 can be developed within the Sun cluster code base.

TABLE 1

Exemplary PGR-Style Function Calls quorum_open
* Inputs: "name" of a specific device as a string; and
A boolean representing whether the device needs to be scrubbed.
* Output: zero (0) on success;
EACCES if restricted from the device; and
EIO on other errors.
* Action: In one example, the name of the device may not be in a particular form (e.g., /dev/did/rdsk eg). However, the name of the device can allow the device type module determine which one of the devices is being opened. Thereafter, if necessary, the device can be opened, and PGRe initialization can be performed. If the node is currently booting and thus is restricted from the device, and EACCES is returned, later on, the quorum_open call can be retried in the boot sequence. According to one embodiment, if the scrub boolean is true, the device has just been added as a quorum device and thus is the first time the device has been opened. In the event the device is configured to perform initialization (e.g., clear the PGRe area if the PGRe area is being used), the device is configured to handle such tasks during the open call. A device may need to perform PGRe initialization if the device is utilizing the PGRe for key management or implementing amnesia safeguards (e.g., amnesia safeguards implemented in the Flexible Amnesia Safeguards of Sun Cluster).

quorum_supports_amnesia_prot
* Inputs: None.
* Output: An integer specifying the degree of support for amnesia protection. According to one example, zero(0) is an indication that an amnesia protection has not been implemented and one (1) is an indication that full-SC3.0 amnesia protection has been implemented. The value returned is specified as an integer to allow flexibility in the future.

quorum_reserve
* Inputs: Key of the local host having a type quorum_key_t.
* Output: Zero (0) on success, EACCES on permission error, and EIO on other errors.
* Action: Defines the reservation key on the device if the key has already been registered with the device. In one example, the reservation style implemented can be "write-exclusive-registrants-only" on the reservation data. As such, any future attempt to issue a quorum_reserve from another node is configured to fail. However, any other type of write actions (e.g., quorum_data_write or quorum_register) are configured to be unaffected by the reservation.

quorum_read_reservations:
* Inputs: Empty quorum_key_list_t where the space for "listsize" of "quorum_key_t" has already been allocated in the "list."
* Output: Zero (0) on success, EACCES on permission error, and EIO on other errors.
* Action: In one instance, writes into the "quorum_key_list_t" "list" of the keys placed on the device using the "quorum_reserve" call. If more keys are defined on the device than are allocated in the "list" (according to the "listsize"), the quorum_read_reservations function is configured to write the first "listsize" keys into the "list" and set "listlen" to be the total number of keys on the device.

quorum_preempt
* Inputs: quorum_key_t of local node, and quorum_key_t of victim node.
* Output: Zero (0) if the victim key has been removed or is not present, EACCES on permission error, and EIO on other errors.
* Action: The reservation and registration of the victim node is removed from the device if the node key is currently registered with the device.
* Note: In a cluster, when two nodes of the cluster attempt to preempt one another, one of the nodes is configured to fail and the other node is configured to succeed. Accordingly, checking the presence of the node key on the device and the removal of the victim key is configured to be atomic.

quorum_register
* Inputs: The key of the local host having a quorum_key_t type.
* Output: Zero (0) on success, EACCES on permission error, and EIO on other errors.
* Action: In one instance, defines the registration key on the device. The key can be removed from the device if the node dies and another node in the cluster TABLE 1-continued Exemplary PGR-Style Function Calls preempts the dead node. In the event the key has not been preempted, explicitly, the key is configured to remain on the device even if the entire cluster or the device is rebooted.

quorum_read_keys
* Inputs: Empty quorum_key_list_t when the space for "listsize" of "quorum_key_t" has already been allocated in the "list."
* Output: Zero (0) on success, EACCES on permission error, and EIO on other errors.
* Action: According to one embodiment, writes the keys placed on the device into the "list" of the "quorum_key_list_t" through the use of the "quorum_register." When more keys are defined on the device than are allocated in the "list" (according to "listsize"), the quorum_read_keys function is configured to write the first "listsize" keys into "list" and set "listlen" to be the total number of keys defined on the device.

quorum_enable_failfast
* Inputs: None.
* Outputs: Zero (0) on success, EACCES on permission error, and EIO on other errors.
* Action: In one example, sets up a time out in the device driver to schedule automatic probes of the device, periodically. The automatic probe function is configured to panic the device substantially immediately if the local host no longer has access rights to the device.

quorum_reset
* Inputs: None.
* Outputs: Zero (0) on success, EACCES on permission error, and EIO on other errors.
* Action: Performs necessary device specific resets, if needed.
* Notes: According to one example, the "quorum_reset" function is provided as an access point for the quorum_SCSI_reset_bus that maybe necessary in the current code for SCSI devices. In one instance, the quorum_reset function can be a "no-op" function, if the quorum_reset function is not needed by the device.

quorum_data_write
* Inputs: "enum" of type DATA_TYPE, pseudo-location, and data stream.
* Outputs: Zero (0) on success, EACCES on permission error, and EIO on other errors.
* Action: In one instance, the quorum_data_write can be a general purpose mechanism for storing information utilized by the quorum algorithm. The pseudo-location can be a value between zero (0) and 65 * 2048 bytes. For example, if the full area reserved for storage may not be used currently, an implementation can map the pseudo-location to a different actual location as long as the mapping can also be used for "quorum_data_read."
* Notes: Although in one embodiment the entire area of the 65 * 2048 bytes may not be used. Presently, limitations may not be imposed as to the use of the entire space in the future. That is, if a device is configured to have a special storage area that has a size of 3 * 2048 bytes, the same amount of data may or may not fit in the special storage area.

quorum_data_read
* Inputs: "enum" of type DATA_TYPE, and pseudo-location.
* Outputs: Data stream from a given location, or zero (0) on success, EACCES on permission error, and EIO on other errors.
* Action: In one example, the "quorum_data_read" function is a general purpose read function capable of retrieving information written by "quorum_data_write."

quorum_monitor_status
* Inputs: In one example, a pointer to a callback pointer in the quorum algorithm.
* Output: "enum" specifying current status of the device, zero (0) on success, EACCES on permission error, and EIO on other errors.
* Action: According to one embodiment, the status of the device is checked by either querying the device or monitoring the last status of periodic querying. In another example, a new thread can be created that is configured to periodically query the device. In such a scenario, if the status of the device has changed, the quorum algorithm can be called to announce the change.

Figure 2:
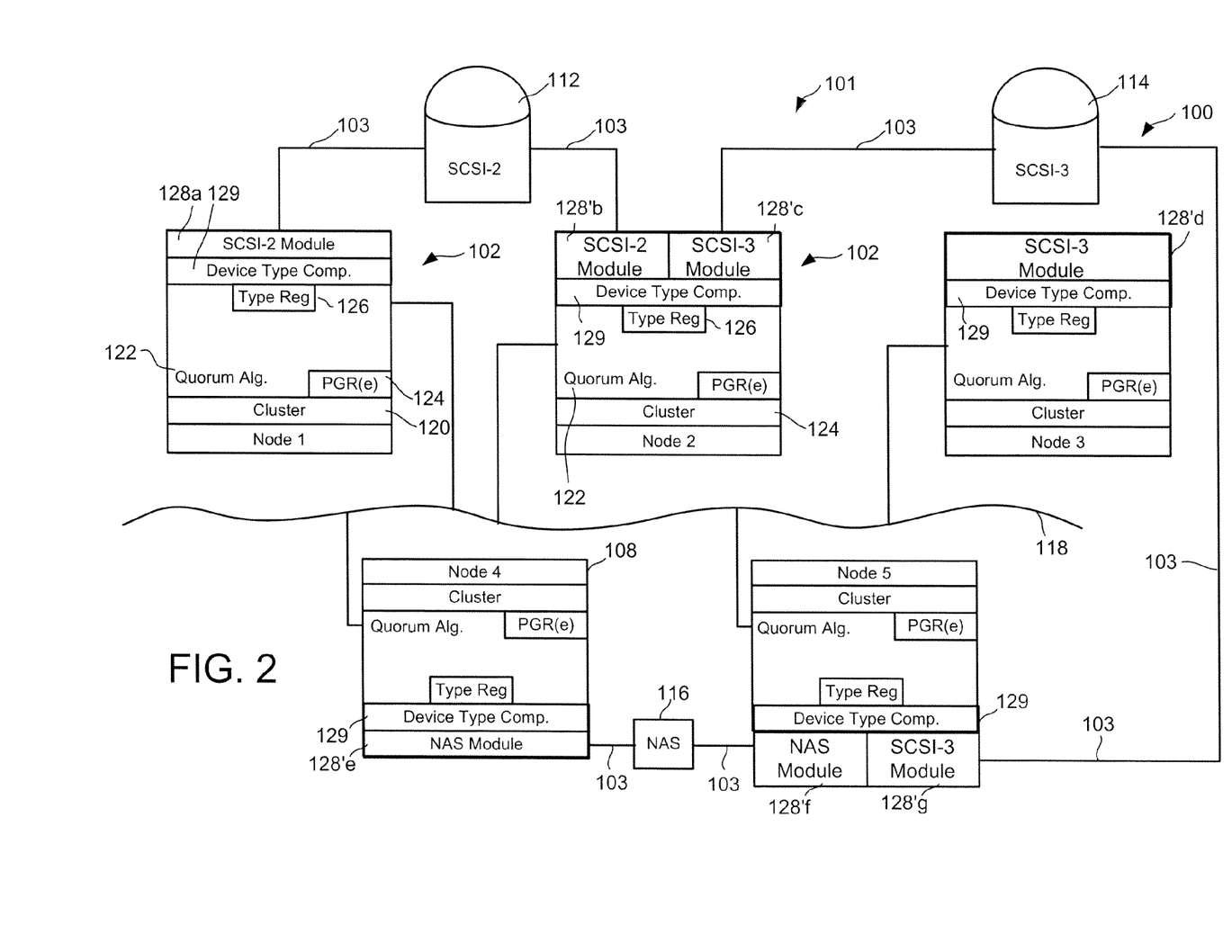
FIG. 2 is an illustration depicting forming of a cluster by the distributed computer system nodes shown in FIG. 1A, in accordance with yet another embodiment of the present invention.

Additional details about the exemplary PGR style calls, using the IDL interface to encapsulate the API methods, and quorum device module structure are provided with reference to FIG. 2.

Reference is made to the distributed computer system 100' illustrated in FIG. 2 depicting a cluster 101, as formed by nodes 1-5, in accordance with one embodiment of the present invention. Nodes 1-5 can communicate and exchange data with one another using the interconnect 118, as a cluster 101 has been formed. Each of the cluster nodes 1-5 is configured to use the interconnect 118 to recognize new nodes as new nodes join, or existing nodes leave the cluster 101. However, as communication can be lost between some of the cluster nodes, maintaining the integrity of data and resources of the cluster may not be possible due to negative effects of split brain or amnesia. As used herein, split brain can occur when multiple sub-clusters are formed as a result of a cluster breaking up into sub-clusters, wherein each sub-cluster may be unaware of the remaining sub-clusters. Amnesia, as used herein, occurs when a sub-cluster starts operation after a shutdown using stale data (i.e., data that is older than data at the time of the shutdown).

Split brain or amnesia conditions can be handled by using quorum algorithms and assigning a vote to each of the cluster nodes 1-5. For the cluster 101 to be operational, the cluster 101 is required to have a majority of votes (i.e., quorum herein defined as a vote count greater than half the total number of votes). In the embodiment illustrated in FIG. 2, establishing the majority of votes is achieved by using the devices 112, 114, and 116 as quorum devices, as each of the devices 112, 114, and 116 (hereinafter also referred to as quorum devices) has quorum device functionality. For additional information about quorum algorithm reference can be made to U.S. Pat. No. 5,828,889 issued on Oct. 27, 1998, entitled "QUORUM MECHANISM IN A TWO-NODE DISTRIBUTED COMPUTER SYSTEM," U.S. Pat. No. 5,948,109 issued on Sep. 7, 1999, entitled "QUORUM MECHANISM IN A TWO-NODE DISTRIBUTED COMPUTER SYSTEM," U.S. Pat. No. 5,999,712 issued on Dec. 7, 1999, entitled "DETERMINING CLUSTER MEMBERSHIP IN A DISTRIBUTED COMPUTER SYSTEM," U.S. Pat. No. 6,108,699 issued on Aug. 22, 2000, entitled "SYSTEM AND METHOD FOR MODIFYING MEMBERSHIP IN A CLUSTERED DISTRIBUTED COMPUTER SYSTEM AND UPDATING SYSTEM CONFIGURATION," U.S. Pat. No. 6,192,401 issued on Feb. 20, 2001, entitled "SYSTEM AND METHOD FOR DETERMINING CLUSTER MEMBERSHIP IN A HETEROGENEOUS DISTRIBUTED SYSTEM," U.S. Pat. No. 6,192,483 issued on Feb. 20, 2001, entitled "DATA INTEGRITY AND AVAILABILITY IN A DISTRIBUTED COMPUTER SYSTEM," U.S. Pat. No. 6,449,641 issued on Sep. 10, 2002, entitled "DETERMINING CLUSTER MEMBERSHIP IN A DISTRIBUTED COMPUTER SYSTEM," and U.S. Pat. No. 6,550,017 issued on Apr. 15, 2003, entitled "SYSTEM AND METHOD OF MONITORING A DISTRIBUTED FAULT TOLERANT COMPUTER SYSTEM." The aforementioned Patents are hereby incorporated by reference in their entirety.

With continued reference to FIG. 2, every cluster node 1-5 is configured to recognize the resources running locally on the node as well as the resources running on each of the other cluster nodes. Each of the cluster nodes 1-5 includes the quorum subsystem 102 and the components included therein (e.g., the type registry 126, quorum algorithm 122, PGR(e) 124, and device type component 129). As can be seen, however, only device type modules corresponding to the quorum device types coupled to each node are loaded into the corresponding node. By way of example, nodes 1 and 2 are coupled to the quorum device (i.e., SCSI-2 attached storage) 112, and thus only associated SCSI-2 modules 128'*a* and 128'*b* have been loaded into the respective operating system kernels of nodes 1 and 2. In a like manner, SCSI-3 modules 128'*c*, 128'*d*, and 128'*g* are loaded into respective operating system kernels of nodes 2-4 coupled to the quorum device (i.e., SCSI-3 attached storage) 114. Lastly, the NAS storage 116 is coupled to nodes 4 and 5, and therefore NAS modules 128'*e* and 128'*f* have been loaded into the respective operating system kernels of nodes 4 and 5.

In accordance with one embodiment of the present invention, cluster nodes 1-5 are configured such that nodes 1-5 can be coupled to more than one quorum device, at any given time. For instance, node 2 includes the SCSI-2 module 128'*b* that interfaces with the quorum device (i.e., SCSI-2 attached storage) 112 and the SCSI-3 module 128'*c* which interfaces with the quorum device (i.e., SCSI-3 attached storage) 114. One of ordinary skill in the art must appreciate that each of the device type components 129 includes a pluggable device specific module corresponding to every device type attached to each of the nodes 1-5. However, only the pluggable quorum device specific module corresponding to the specific quorum device type coupled to each node is loaded into the corresponding node operating system kernel. Of course, this occurs irrespective of the number of quorum device type modules included in each of the device type components 129. In this manner, quorum can be established in the cluster while the amount of code to be loaded into each of the nodes is substantially reduced. Among other benefits, reducing the amount of code loaded into kernel also results in reducing the memory footprint as well as the length of time required to load the cluster.

In accordance with one embodiment of the present invention, one of ordinary skill in the art must appreciate that any type of device can be implemented as a quorum device so long as the type of device has the quorum device capability (e.g., SCSI-2, SCSI-3, NAS storage, Cable, quorum server (e.g., functionalities provided by a process running on a different machine), service processors as tie breakers, internet SCSI (iSCSI) compatible devices, etc.). It must further be noted by one of ordinary skill in the art that although in the embodiments shown in FIGS. 1A and 2 the device type component 129 includes four pluggable quorum device type modules, in a different embodiment, the device type component 129 may include any number of pluggable quorum device type modules. Further, each device type component is defined to include quorum device type modules corresponding to each of the quorum device types connected to the cluster nodes. Yet further, one of ordinary skill in the art must appreciate that new pluggable quorum device type modules corresponding to new types of quorum devices may be added to the device type component 129 as new quorum device types are discovered and/or as desired. Still further, one of ordinary skill in the art must recognize and appreciate that the shared storage devices implemented as quorum devices (e.g., quorum devices 112 and 114) can be individual storage devices or an array of storage devices that can be simultaneously coupled to two or more computers. Moreover, one of ordinary skill in the art must appreciate that the interconnect 112 can be any appropriate connection mechanism so long as communication and exchange of data between the cluster nodes 1-5 can be established (e.g., Ethernet network connected to network Ethernet controller circuitry, serial communications interface (SCI) transport, etc.).

Each of the quorum algorithm 122, type registry 126, device type component 129, and PGR(e) 124 of the quorum subsystem 102 defined in each of the cluster nodes 1-5 performs specific functions. The quorum algorithm 122 ensures that the distributed computer system 100' continues to operate with the greatest number of available nodes using the majority vote count (i.e., when the quorum algorithm 122 detects a quorum). In the illustrated embodiment wherein nodes 1 and 2 are attached to the quorum device SCSI-attached storage 112, each of the nodes 1 and 2 is assigned one vote, and the SCSI-2 attached storage 112 is (2-1) votes. As to nodes 2-4, 3, and 5 coupled to the quorum device SCSI-3 attached storage, each of the nodes is given a vote, and the quorum device SCSI-3 attached storage 114 is given (3-1) votes. Lastly, each of the nodes 4 and 5 coupled to the NAS storage 116 is given one vote while the NAS storage 116 is given (2-1) votes. In one embodiment, the quorum algorithm 122 includes data structures capable of organizing a quorum device table. In one example, the quorum device table can be an array of references to common object request broker architecture (CORBA) objects that implement the internals of the quorum device. For instance, the internals of the quorum device provide the communication layer for commanding and querying the quorum device so that the quorum API functionalities can be accomplished. Furthermore, quorum device specific attributes (e.g., "vnode" pointer, name, etc.) can be held as instance variables within a C++ object. Of course, one must note that in other embodiments, other quorum device specific attributes can be held as instance variables within the C++object. According to another instance, the quorum algorithm 122 can call an appropriate interface definition language (IDL) call when the quorum algorithm 122 is configured to trigger actions that can correspond to the quorum device API functionalities.

The quorum device type registry 126 provides the initial communication between the quorum algorithm 122 and the device type modules. According to one embodiment, a single quorum device type registry object is created and initialized per node as part of ORB::initialize( ). However, one must note that in a different example, multiple quorum device type registry objects can be created and initialized per node. The type registry initialization includes registering with a local nameserver as well as creating an array of function pointers called a "type table." Initially, the type table will be empty. Function pointers are used to point into quorum device specific type modules defined in the device type component 129, as the quorum device type modules are loaded. However, one of ordinary skill must appreciate that in a different embodiment, any suitable mechanism may be used to point into the quorum device type modules.

PGRe 124, yet another component of the quorum subsystem 102, is an algorithm used to store, read, and preempt reservation keys on an area of the quorum device. As is described in more detail below, when a quorum device cannot support PGR-style reservations, internal PGRe style reservations can be provided using the PGRe 124. By way of example, while the SCSI-3 standard can support the PGR-style reservations, the SCSI-2 standard lacks such a capability. The SCSI-3 standard PGR features enhance the SCSI-2 standard, rendering the SCSI-3 disks as convenient quorum devices. First, SCSI-3 standard allows a host node to make a disk reservation that is persistent across power failures and bus resets. Second, group reservations are permitted, allowing all nodes 1-5 running in the cluster 101 to have concurrent access to the SCSI-3 disk while denying access to nodes not in the cluster 101. The persistence property allows SCSI-3 devices to remember reservation information across power interruptions, while the group reservation property allows the quorum device to provide reservation functionality for more than two nodes at a time. In this manner, the quorum device SCSI-3 disk can store customer data and also act as a quorum device. Furthermore, the quorum disk SCSI-3 can affect the quorum algorithm by implementing a plurality of primitives. The list of primitives includes storing a node reservation key on the quorum device, reading all keys on the quorum device, preempting the reservation key of another node, placing a group reservation for all registered nodes, and reading the group reservation information. For additional information about PGR and PGRe reference can be made to U.S. Pat. No. 6,658,587 issued on Dec. 2, 2003, entitled "EMULATION OF PERSISTENT GROUP RESERVATIONS." The aforementioned Patent is hereby incorporated by reference in its entirety.

Quorum device SCSI-2 disk, however, lacks internal management of registration groups such as PGR-style reservation. SCSI-2 compatible disks (e.g., Sun Microsystems, Inc. Supported SCSI-2 compatible disks, etc.) can implement the TKOWN and RELEASE Input Output Controls (hereinafter, "ioctls"). By using the ioctls, each single node of the set of nodes (node 1 and node 2) connected to the quorum device SCSI-2 attached storage 112 can gain exclusive access to the SCSI-2 attached storage 112. In this manner, the SCSI-2 attached storage 112 can then use a PGRe call to manage the keys on the SCSI-2 attached storage 112 so as to provide protection against split brain and amnesia. In this manner, by using the PGRe 124 and a form of access control to the quorum device 112, the quorum device 112 can support substantially all the quorum algorithm API functions defined by the quorum algorithm API.

One of ordinary skill in the art must recognize and appreciate that in one embodiment, the PGRe algorithm 124 can be used only in combination with a form of exclusive access. Of course, either one of the nodes connected to the SCSI-2 attached storage 112 can exclude each of the remaining nodes 1 and 3-5 from writing to the SCSI-2 attached storage 112. In this manner, the quorum device SCSI-2 attached storage 112 can provide support to only the two attached nodes (e.g., node 1 and node 2). Of course, if the SCSI-2 attached storage 112 were to be connected to three nodes (e.g., nodes 1-3), and two nodes (e.g., nodes 1 and 3) of the cluster died and node 1 (i.e., the first node) is rejoined, the surviving node 2 cannot release access control for the joining node 1 while still maintaining access control against the node 3 that is still down.

It must be noted that other more flexible forms of access control can also be used to protect the PGRe 124 preempt call (e.g., a NetApp filer can provide a "prevent access to node X" interface and as such, can be used to protect the PGRe 124 preempt call, etc.). As more flexible forms of access control can be implemented, the PGRe 124 algorithm can support greater than two-node connectivity. In accordance with one embodiment, the connectivity supported by the PGRe 124 algorithm can depend entirely on the form of access control.

In one embodiment, the PGRe API can define the following exemplary function calls:

quorum_pgre_reserve quorumpgre_read_reservations quorum_pgre_preempt quorum_pgre_read_keys quorum_pgre_write_key The exemplary PGRe function calls can take the same inputs as the PGR functions and can return similar outputs as the PGR. In one embodiment, an implementation of the PGRe function calls can be defined in a separate library.

According to one embodiment, an IDL interface can be defined so as to encapsulate the API methods, thus requiring all quorum device types to implement the IDL interface. By way of example, an instance of a class can directly stand for a particular quorum device of the specific quorum device type. The quorum_open call can be used to initialize the device information (e.g., name, vnode pointer, etc.). However, the quorum algorithm may only have a reference to the object that is the generic type of the IDL interface. Of course, the class can keep internal information about name, PGRe area, block number, communication parameters, or any quorum device specific information. In this manner, the quorum algorithm is configured to keep track of a single array of pointers to the quorum device instances. Using the IDL interface can create a clean interface between quorum functionality and device functionality. Furthermore, by using the BDL interface, user level applications as well as device fencing are also allowed clean access to the quorum calls.

According to one example, a new interface can be added to the "quorum.idl" file, defining the quorum_device_type interface using the methods described in the API methods. Any new quorum device type can provide a C++ class configured to inherit from "McServerof<quorum_device_type>." One of ordinary skill in the art must appreciate that all the IDL invocations may be local calls. Of course, nonlocal function calls can be turned into local function calls by the object request broker (ORB) code, substantially eliminating the possibility of incurring a large overhead.

According to one embodiment of the present invention, each quorum device module 129a'-129e' is configured to define the following exemplary structures:

```
#define QUORUM_KEY_SIZE 8
typedef struct quorum_key {
uchar_t key[QUORUM_KEY_SIZE];
} quorum_key_t;
typedef struct quorum_key_list {
uint32_t listsize;
uint32_t listlen;
quorum_key_t *list;
} quorum_key_list_t;
```

In accordance with one embodiment, the cluster 101 can use a failfast mechanism to prevent a failed node from rebooting and thereafter writing to the shared storage devices. In one exemplary embodiment, the quorum algorithm of the present invention provides a common implementation of a polling thread. The implementation can be a part of the PGRe library. An exemplary signature for the polling thread is:

void quorum_pgre_enable_failfast(quorum::quorum_device_type_ptr d, int poll_period);

The function quorum PGRe-enabled failfast is configured to create a separate thread to be invoked approximately once every poll_period per second. Furthermore, the function is configured to use the device type pointer to read the keys defined on the device. If the current node key is missing from the device, the polling thread is configured to immediately panic the node. In one example, failfast may be enabled only once in a node lifetime instantaneously after the node has registered the node key on the device. In this manner, the failfast may be prohibited from killing a valid node in the cluster.

According to one implementation, multiple threads may access the quorum device type module functions at the same time. Therefore, when the device type module can use the generic failfast implementation, the quorum device type modules can protect various interface calls with synchronization, if necessary. Of course, whether synchronization is necessary may depend on the characteristics of the quorum device. For example, if a quorum device supports "inkeys" and "scrub" commands, internally, the quorum device module can pass the quorum algorithm call to the quorum device type. In the latter scenario, synchronization may not be necessary if the quorum device implements mutual exclusion on the registration information, internally. However, if the quorum device supports "inkey(i)" and "scrub," only where "inkey(i)" reads the i'th key on the quorum device, the quorum device type module may need to implement the API call for "read_registrations" by looping over all possible "i"s. In such a situation, if the "scrub" function can be processed in the middle of the "read_registrations" loop, the scrub function may have been provided with an inconsistent view of the quorum device registrations. In the latter scenario, the quorum device type module may need to implement the internal synchronization of the quorum device type module.

In the cluster 101, a Sun cluster Configuration "scconf" command can be implemented so as to change the cluster configuration, dynamically. In accordance with one embodiment of the present invention, scconf command can be modified so as to be more flexible for adding and configuring quorum devices. For instance, device specific ".so" extensions of scconf command can be used to validate quorum configuration information, or "clpl" files can be used to define the valid configuration values for quorum device types. With both possibilities, the quorum device attributes can be written into the Cluster Configuration Repository (CCR) such that the device type module can retrieve the quorum device attributes from the CCR. The CCR is a private cluster-wide database for storing information pertaining to the configuration and state of the cluster 101. The CCR can be a distributed database with each node maintaining a complete copy of the database. The CCR ensures that all nodes have a consistent view of the cluster "world." To avoid data corruption, each node needs to know the current state of the cluster resources. Such task is achieved by the CCR using a two-phase commit algorithm for updates. Each update should complete successfully on each of the cluster nodes 1-5 or the update is rolled back. The CCR uses the cluster interconnect 118 to apply the distributed updates.

In one embodiment, a format of the scconf command line is as follows:

scconf-aq type=foo,devicename=bar[,option1=value1, option2=value2, . . . ]

scconf-cq type=foo,devicename=bar[,option1=value1, option2=value2, . . . ]

scconf-rq type=foo,devicename=bar

Modifying scconf command may be achieved by providing a single shared library for each quorum device type. The library can be opened by scconf command and can provide routines necessary for validating the properties of a given quorum device type. Using the latter option, raw storage disks can be accessed using a "/dev/did" path, Soltice DiskSuite (SDS) volume manager volumes can be accessed using a "/dev/md" path, and a Veritas VxVM volumes can be accessed using a "/dev/vxvm path." Depending on the device path provided to the scconf command, the system call dlopen( ) can be used to open a shared library containing validation routines for the corresponding type of quorum devices. The shared library can be found by the scconf command and is handed off arguments required to parse a function in the shared library.

The scconf command can be implemented so as to obtain the arguments from the scconf command line, determine the type of quorum device being configured, and "dlopen" the corresponding quorum device type library. The scconf command can then call into the corresponding quorum device type library so as to pass the parameters from the scconf command line. In this manner, the scconf command is more flexible as the scconf command may not need to know of all the possible configuration options for each quorum device. Alternatively, the scconf command may need to pass the call inquiring the configuration of the quorum device onto the library. According to one implementation, a respective library can be written for each type of quorum device configured to be supported by the scconf command. In one embodiment, most of the vote operations (e.g., set, sync, reset, etc.) can be performed at the level of the "libscconf file" thus eliminating the need to duplicate the code in the shared library implementations.

One must note that quorum device type specific operations may be added or deleted. By way of example, quorum device type specific operations performed to establish connectivity and cleanup on delete as well as a form of set and get of properties can be added or deleted. The "scconf_cfg_prop_t" structure having simple key/value container can be used. In one instance, the keys and the respective key values can both be characters. Scconf files used to deal with quorum devices may implement the exemplary interfaces provided in Table 2.

TABLE 2

Exemplary Interfaces Implemented by Scconf Files to Deal with Quorum Devices

```
/* Common shared library path for quorum devices shared objects. */
#define SCCONF_QUORUM_SHARED_LIB_DIR "/usr/cluster/lib/qd"
#define SCCONF_ADD_QUORUM_DEVICE "quorum_add_qd"
#define SCCONF_REMOVE_QUORUM_DEVICE
"quorum_remove_qd"
#define SCCONF_SET_QUORUM_DEVICE_PROPERTIES
"quorum_set_qd_properties"
#define SCCONF_GET_QUORUM_DEVICE_PROPERTIES
"quorum_get_qd_properties"
/*
 * Quorum_add_qd would can add a device with the respective
 * appropriate paths, configuration info, and a vote of zero (0). Then,
 * scconf can increase the vote to the appropriate amount.
 */
    scconf_errno_t quorum_add_qd(char *qdname, scconf_cfg_prop_t
    *qdproperties);
/*
 * The entry criteria for the latter function is when the QD has a vote of
 * zero (0). The latter function is responsible for the final remove step.
 */
scconf_errno_t quorum_remove_qd(char *qdname);
scconf_errno_t quorum_set_qd_properties(char *qdname,
    scconf_cfg_prop_t *qdproperties);
scconf_errno_t quorum_get_qd_properties(char *qdname,
    scconf_cfg_prop_t **qdproperties);
```

In one embodiment of the present invention, the cluster 101 can be upgraded from the current version of the cluster software to any of the later developed cluster software versions without having to shut down the entire cluster 101. The rolling upgrade process can be implemented to upgrade cluster nodes, one node at a time. However, the upgrading operation is performed such that services and resources offered by the cluster 101 are always available even though the node being upgraded cannot be accessed. At times, the quorum device type modules available on different nodes may vary. As such, adding a new quorum device should be prevented if all nodes of the cluster 101 do not support the new quorum device type. According to one implementation, a new version of a protocol "(vp)," and "quorum_devices" can be added. A file can also be added under "usr/src/common/cl/vm/quorum_devices.vp" to control the protocol. The new version of the protocol can be a cluster-wide "vp," in which the protocol version is unknown until all nodes of the current cluster 101 can support the specific version.

The rolling upgrade framework may permit the cluster 101 to boot at a lower version. For instance, all the nodes of the cluster 101 are rebooted in response to the cluster commitment to be upgraded. However, a node that was not part of the cluster at the time of such commitment may not support the higher version of the protocol. According to one example, a custom callback can be utilized by the "quorum_devices vp" if a new quorum device type is being added to the cluster and some nodes in the cluster do not support the new type of quorum device. For additional information about the rolling upgrade framework reference can be made to U.S. patent application Ser. No. 10/800,511 filed on Mar. 15, 2004, entitled "OPTIMAL CALLBACK NOTIFICATION IN A DISTRIBUTED SYSTEM." The aforementioned Patent Application is hereby incorporated by reference in its entirety.

Enforcing the upgrade restrictions may need each of the shared libraries supporting scconf command to also support an upgrade validation routine. The latter routine queries the version manager so as to determine the current version of the quorum_devices protocol. In this manner, the requested device type being added as a quorum device can be supported by the current cluster 101.

In one exemplary embodiment, once the quorum device type registry 126 receives the get_quorum_device function call, the quorum device type registry 126 inquires into the type table. In one embodiment, the type table can be indexed by the enum qd_type_t function, which contains a function pointer for each type of quorum device. If the function pointer is NULL, an indication is made that the quorum device type module for the specific type of quorum device has not been loaded, yet. In the latter scenario, the quorum device type registry 126 can first load the quorum device type module as part of the get_quorum_device function call. According to one embodiment, the quorum device type is loaded through a call to a "modload" function call. Thereafter, quorum device type modules can be installed in /kernel/misc of the node 2. The quorum device type modules installed in the operating system kernel can have the form "clq_(type_name)." By way of example, a type_name is the name of the quorum device type, wherein for instance, the SCSI-3 attached storage 114 is installed in a module named /kernel/misc/clq_SCSI3.

As part of the init( ) function of each device type module, the device type module is configured to look up the type_registry in the local nameserver. Then, the module can call register_device_type on the type_registry, passing in the enum value of the device type and a pointer to a function within the module, creating, and returning a quorum::quorum_device_type_ptr. The type_registry is configured to save the function pointer in an internal table. However, each of the future get_quorum_device calls is configured to use the pointer, directly, instantiating the object. One of ordinary skill in the art must recognize and appreciate that in the latter scenario, a new quorum device object was not initialized. Specifically, initializing the new quorum device can be accomplished through the quorum_open function. In one example, the quorum_open function call is issued when the quorum algorithm is configured to make the call to get_quorum_device.

Figure 3A:
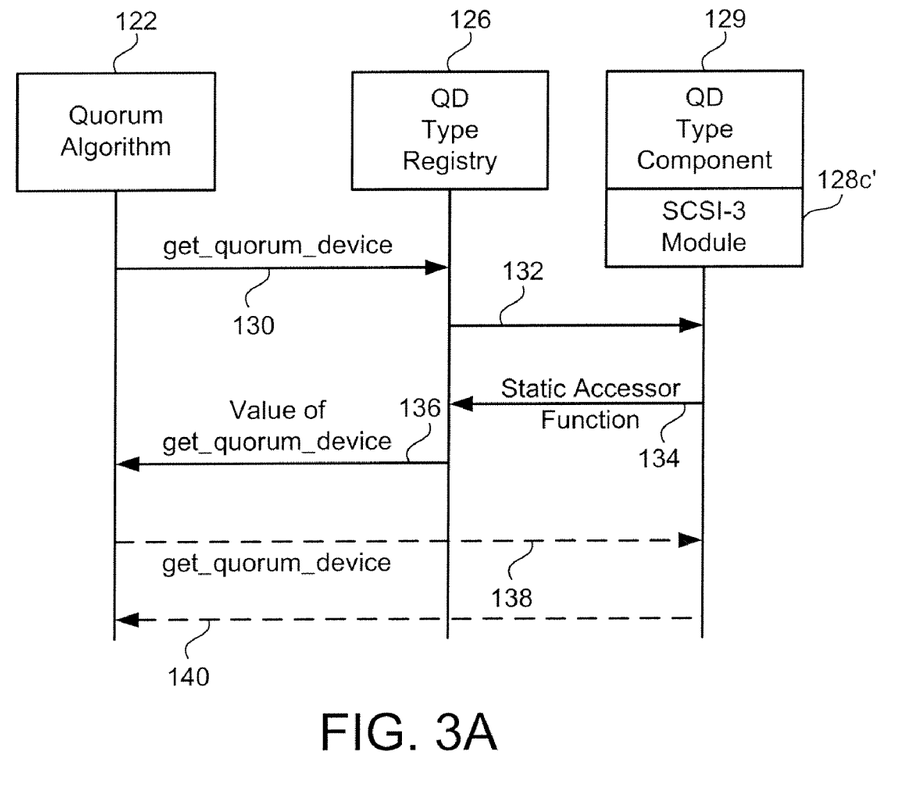
FIG. 3A depicts an interaction sequence between a SCSI-3 device specific module and the quorum algorithm of the quorum subsystem of the present invention as the SCSI-3 device specific module is being loaded into the operating system kernel, in accordance with one embodiment of the present invention.
Figure 3B:
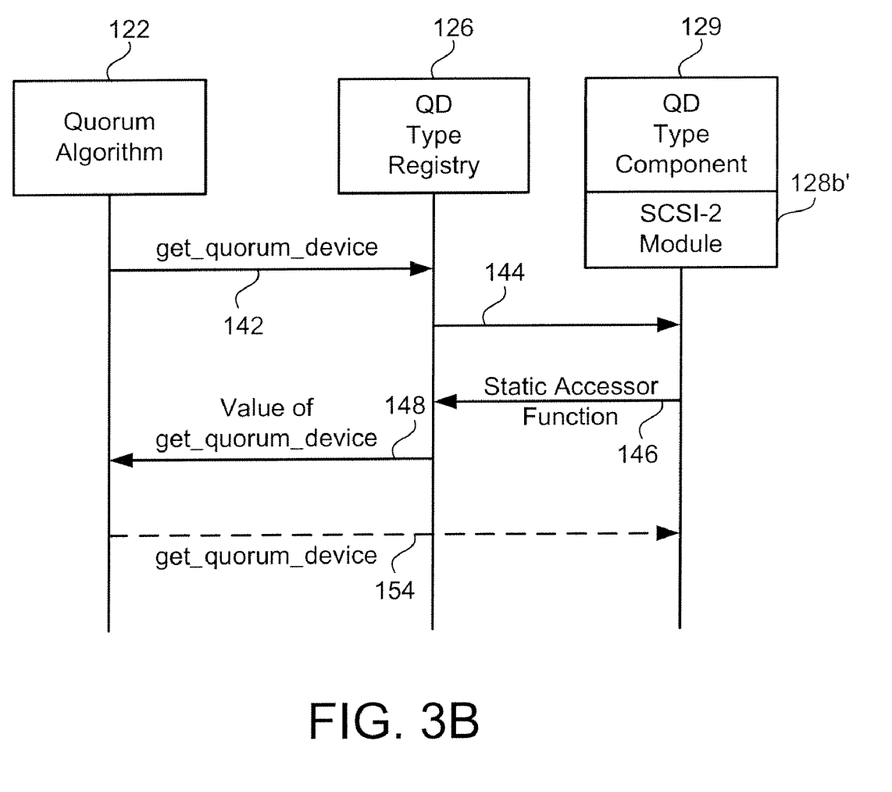
FIG. 3B depicts an interaction sequence between a SCSI-2 device specific module and the quorum algorithm of the quorum subsystem as the SCSI-2 device specific module is being loaded into the operating system kernel, in accordance with one embodiment of the present invention.

Proceeding to the sequence diagrams illustrated in FIGS. 3A and 3B, interaction sequence between components of the exemplary quorum subsystem 102 defined in node 2 can further be understood, in accordance with one embodiment of the present invention. FIG. 3A depicts an interaction sequence between the SCSI-3 device specific module 128'c and the quorum algorithm 122 of the quorum subsystem 102, as the SCSI-3 device specific module 128'c is being loaded into the operating system kernel, in accordance with one embodiment of the present invention. To use the attached SCSI-3 disk 114 as a quorum device, the quorum algorithm 122 issues a call 130 to the quorum device registry 126 so as to obtain information about the attached SCSI-3 device. In one example, the issued call can be a get_quorum_device( ) call to the QD type registry. In a different embodiment, depending on the device type, the get_quorum_device( ) call may also be used to perform additional initializations operation for the device. For instance, get_quorum_device( ) can call "new" function on the class defined in the quorum device type module. At this point, the "new" function may initialize a timeout value, or perform a different type of initialization.

In one embodiment, to add a new quorum device to the device table defined in the QD type registry 126, the quorum algorithm 122 is configured to query the quorum device type registry 126. By way of example, the quorum algorithm 122 can obtain a reference to the quorum device type registry 126 from the local nameserver, and thereafter call a "get_quorum_ device" function defined in the BM specification. An exemplary "get_quorum_device," function can be as follows:
    interface device_type_registry {
    quorum_device get_quorum_device(in qd_type_t type);
    };

According to one embodiment, the quorum algorithm 122 may seek to obtain information about a new device type (e.g., the SCSI-3 device 114) being added to the cluster. For instance, when node 2 is booting, the cluster configuration repository (CCR) is read. The new SCSI-3 device type is configured by scconf command. Then, the device type registry 126 searches a list of quorum device types that is maintained by the device type registry 126. If the quorum device SCSI-3 type is being configured for the first time, the list of quorum device types does not include a loaded SCSI-3 module. Thus, the quorum device type registry 126 communicates 132 with the quorum type component 129 so as to load the SCSI-3 module 128'c. For instance, a "modload" communication 134 can be performed on the corresponding device type module SCSI-3 module 128'c. In one example, the corresponding quorum device type module can be located by using the device type name and a directory. For instance, the quorum device type modules will be in /kernel/misc for a 32-bit system and in /kernel/misc/sparcv9/for a 64-bit system. The quorum device type component thereafter creates a quorum device object (e.g., quorum device SCSI-3 object) and communicates 134 a reference to the SCSI-3 module (e.g., SCSI-3 quorum device object) to the quorum device type registry 126. The device type registry 126 in turn communicates 136 the created reference to the SCSI-3 module with the quorum algorithm 122.

However, if the device type registry 126 includes a previously loaded SCSI-3 module (i.e., a SCSI-3 device attached to a cluster node is being used as a quorum device), the quorum device type registry 126 communicates 136 with the previously loaded SCSI-3 module. In this manner, once a device type module has been loaded into the type registry 126, the type registry 126 can use the loaded SCSI-3 module to instantiate new quorum devices. In this manner, each quorum device type module can be loaded once, irrespective of the number of quorum devices of the same type present.

FIG. 3B depicts an interaction sequence between the SCSI-2 device specific module 128'b and the quorum algorithm 122 of the quorum subsystem 102 as the SCSI-2 device specific module 128'b is being loaded into the operating system kernel, in accordance with one embodiment of the present invention. Following the same call sequence as the SCSI-3 module depicted in FIG. 3B, the quorum algorithm 122 is provided with the reference to the SCSI-2 module through communications 142, 144, 146, and 148. In the illustrated embodiment, however, after the SCSI-2 module has been loaded, the SCSI-2 module 128'b communicates with the PGRe using the PGRe interfaces provided by a library. Thereafter, the quorum algorithm communicates read and/or write calls to the PGRe sections so as to provide persistent key storage on the quorum device SCSI-2 112. In one example, a separate version of the PGRe interfaces need not be implemented.

Figure 4:
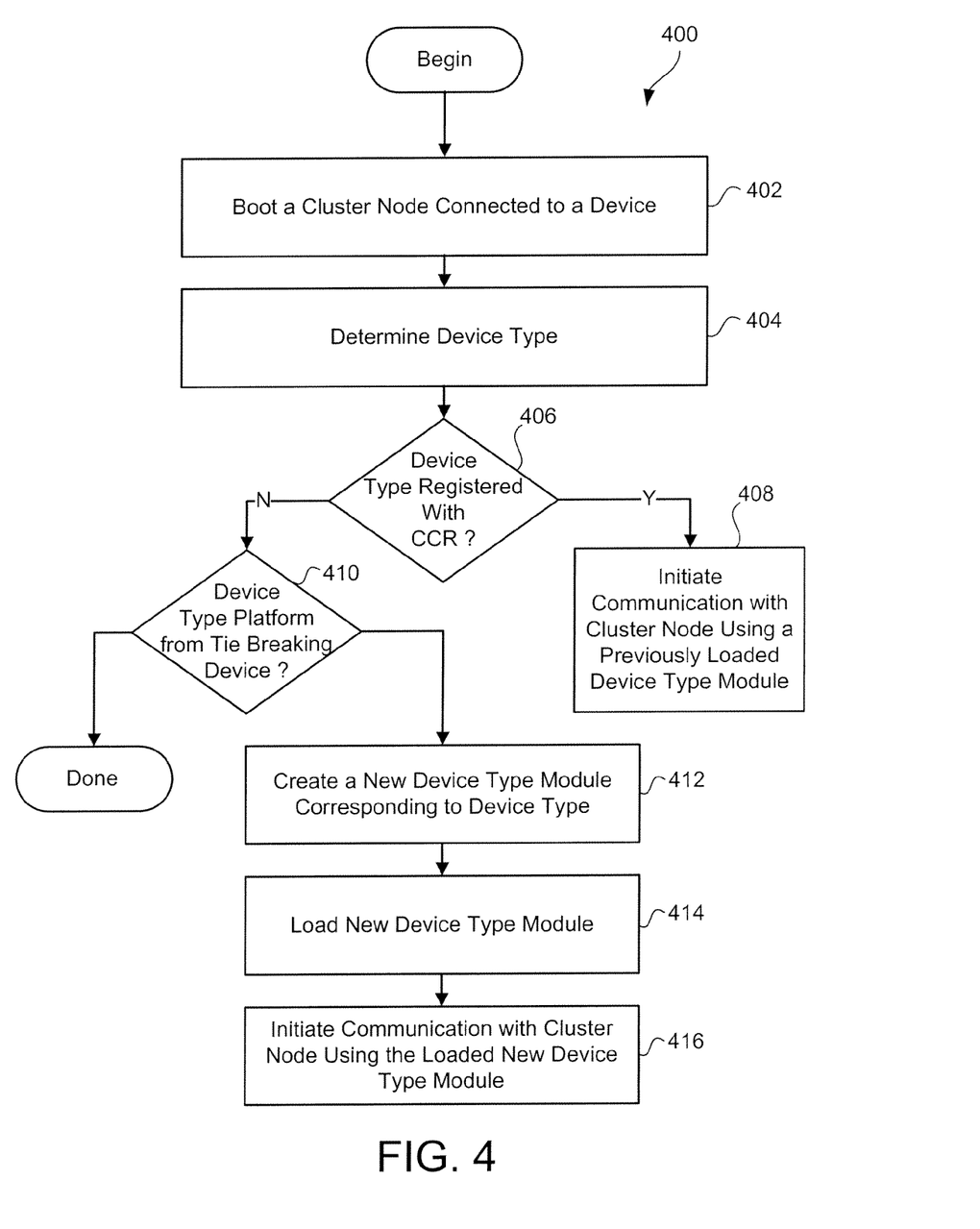
FIG. 4 depicts a flowchart diagram showing method operations performed to implement a device connected to a new cluster node as a quorum device, in accordance with yet another embodiment of the present invention.

Reference is made to a flowchart diagram 400 illustrated in FIG. 4 showing method operations performed when using a device having quorum device functionality connected to a new cluster node as a quorum device, in accordance with one embodiment of the present invention. In one example, the pluggable device specific components of the present invention can be implemented in Sun Microsystems, Inc. servers running on Solaris. However, one must note that the pluggable device specific components and the quorum algorithm APIs of the present invention can run on servers running on any appropriate system (e.g., Linux, etc.). Once loading the Solaris module has begun, the Sun cluster initiates loading the Sun cluster module, thus commencing the internal quorum algorithm. For instance, part of initializing the quorum algorithm can include reading the CCR to determine the quorum device types that have been configured. Thereafter, quorum initialization requests that the type registry load the pluggable device specific component corresponding to the device. The newly added Sun cluster node can then initiate communication with the other nodes in the cluster. The number of votes is determined so as to determine whether a cluster can be formed. If the number of votes is sufficient for quorum, loading the Sun cluster module has been completed and a working cluster has been formed. However, if the cluster initialization cannot be continued due to lack of quorum, initialization is suspended until another node is added to the cluster followed by counting the votes. Once the cluster is formed, the remaining Solaris and Sun cluster components can be launched.

Once the cluster has been formed, the method starts in operation 402 wherein the new cluster node coupled to the device is loaded. In operation 404, a determination is made as to the type of the device. Once the device type has been determined, in operation 406, a determination is made as to whether the device type was previously registered with the CCR. Specifically, a determination is made as to whether any of the cluster nodes is coupled to a quorum device having the same device type. If the device type to be added has already been used as a quorum device (i.e., the device type to be used can support quorum device functionality), the method continues to operation 408 wherein communication is initiated with the cluster node using a previously loaded device type module corresponding to the quorum device.

If in operation 406 a determination is made that the device type to be used has not been registered with the CCR, the method continues to operation 410 wherein a determination is made as to whether the device to be added can support quorum device functionality. When the required quorum device functions can be performed, a new device type module corresponding to the new device type is created. The new device type module is then loaded into the operating system in operation 414 followed by operation 416 wherein communication is initiated with the new cluster node using the loaded new device type module.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion. Furthermore, the pluggable device specific components of the present invention can be implemented in any appropriate programming language (e.g., "C," "C++" etc.).

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A distributed computing system implemented on a plurality of server computers, comprising:
    a first node and a second node, the first node being in communication with the second node, each of the first node and the second node including component specific modules; and
    a first quorum device coupled to the first node and the second node;
    a second quorum device differing in device type from the first quorum device;
    first and second selected component specific modules defined in the first node and the second node, the selected component specific modules configured to correspond with the device types, and to enable the first node and the second node to
    access both of the quorum devices by providing quorum algorithm interfaces, wherein said interfaces establish a quorum containing at least the first and second nodes;
    a device type registry defined in the first node and the second node, the device type registry coupled to a quorum algorithm and the component specific modules so as to provide initial communication between the quorum algorithm and the component specific modules, the device type registry further including a type table having an array of function pointers used to point into the selected component specific module.

2. A distributed computing system as recited in claim 1, wherein the selected component specific module corresponding to the quorum device included in the first node provides an interface functionality between the quorum device and the first node, and further wherein the selected component specific module corresponding to the quorum device included in the second node provides an interface functionality between the quorum device and the second node.

3. A distributed computing system as recited in claim 2, wherein the interface functionality between the quorum device and the first node is configured to define a device functionality to be supported by the quorum device, and further wherein the interface functionality between the quorum device and the second node is configured to define the device functionality to be supported by the quorum device.

4. A distributed computing system as recited in claim 1, wherein only the selected component specific module corresponding to the quorum device is loaded in the first node when accessing the quorum device, and further wherein only the selected component specific module corresponding to the quorum device is loaded in the second node when accessing the device.

5. A distributed computing system as recited in claim 1, wherein the first node and the second node form an operational cluster.

6. A distributed computing system as recited in claim 5, wherein only the selected component specific module corresponding to the device is loaded into the first node when accessing the device, and further wherein only the selected component specific module corresponding to the device is loaded into the second node when accessing the device.

7. A distributed computing system as recited in claim 5, wherein the device is one of a Small Computer System Interface (SCSI) SCSI-2 storage, a SCSI-3 storage, a network-attached storage (NAS), a cable storage, and a server storage.

8. An apparatus for using devices having quorum device functionality as quorum devices in a clustering environment, the apparatus comprising:
    a communication interconnect;
    a first node linked to the interconnect;
    a second node linked to the interconnect;
    a first peripheral device communicatively linked to the first node and supporting a set of quorum device functions; and
    a second peripheral device communicatively linked to the second node and supporting the set of quorum device functions, wherein the second peripheral device is of a type differing from the first peripheral device,
    wherein the first node includes a first quorum device specific module corresponding to the type of the first peripheral device and wherein the second node includes a second quorum device specific module corresponding to the type of the second peripheral device, and
    wherein the first and second nodes use the first and second peripheral devices, respectively, as quorum devices to establish a quorum in a cluster containing at least the first and second nodes.

9. The apparatus of claim 8, wherein the first quorum device specific module implements a first set of quorum algorithm API functionalities to facilitate communication of the first node with the first peripheral device and wherein the second quorum device specific module implements a second set of quorum algorithm API functionalities, differing from the first set, to facilitate communication of the second node with the second peripheral device.

10. The apparatus of claim 9, wherein the first node is communicatively linked to the second peripheral device, includes the second quorum device specific module, and uses both the first and second peripheral devices as quorum devices in the cluster.

11. The apparatus of claim 8, wherein the types of the first and second peripheral devices are selected from the group consisting of a SCSI-2 device, a SCSI-3 device, and a NAS device.

* * * * *

UNITED STATES PATENT AND TRADEMARK OFFICE
CERTIFICATE OF CORRECTION

PATENT NO.         : 7,698,390 B1
APPLICATION NO.    : 11/093914
DATED              : April 13, 2010
INVENTOR(S)        : Jennifer C. Harkness et al.

It is certified that error appears in the above-identified patent and that said Letters Patent is hereby corrected as shown below:

In column 12, line 29, delete "quorumpgre" and insert -- quorum_pgre --, therefor.

In column 12, line 54, delete "BDL" and insert -- IDL --, therefor.

In column 17, line 2, delete "BM" and insert -- IDL --, therefor.

In column 17, line 35, delete ""$C^{++}$"" and insert -- "C++," --, therefor.

Signed and Sealed this
Twelfth Day of April, 2011

David J. Kappos
*Director of the United States Patent and Trademark Office*